H. A. LUGRIN.

Assignor to himself and P. NORDMANN.

STOP WATCH.

No. 10,770. Reissued Sept. 28, 1886.

WITNESSES:

INVENTOR

Henry A. Lugrin by Geo. H. Raegener his ATTORNEYS

N. PETERS, Photo-Lithographer, Washington, D. C.

UNITED STATES PATENT OFFICE.

HENRY A. LUGRIN, OF NEW YORK, N. Y., ASSIGNOR TO HIMSELF AND PROSPER NORDMANN, OF SAME PLACE.

STOP-WATCH.

SPECIFICATION forming part of Reissued Letters Patent No. 10,770, dated September 28, 1886.

Original No. 232,737, dated September 28, 1880. Application for reissue filed May 27, 1886. Serial No. 203,465.

*To all whom it may concern:*

Be it known that I, HENRY A. LUGRIN, of the city of New York, in the county of New York and State of New York, have invented certain new and useful Improvements in Stop-Watches; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to improvements in stop-watches in which the timing attachment is thrown in or out of gear with the watch-movement by means of the two toothed wheels and an intermediate double-beveled pinion; and the invention consists of a timing attachment consisting of a toothed wheel on the arbor of the fourth wheel, of an intermediate double-beveled transmitting-pinion, and of a second toothed wheel which is applied to a hollow tubular arbor that passes through the hollow tubular arbor of the minute-hand and carries the quarter-second hand at its opposite end. The arbor of the split quarter-second hand passes through the hollow arbor of the quarter-second hand, the latter being provided with a shifting mechanism, lifting-lever, and spring to throw its toothed wheel in or out of gear with the pinion, while the arbor of the split quarter-second hand has a stop-disk at the top of the movement. The arbor of the minute-hand is provided with a stop-disk and with a sleeve-shaped arbor which carries a split minute-hand. A spring-arm bears on the disk and stops the split minute-hand when it is desired to use the split quarter-second and minute hands. The split minute-hand is carried up to the minute-hand when the stop-disk is released by the usual shifting mechanism.

Figure 1:
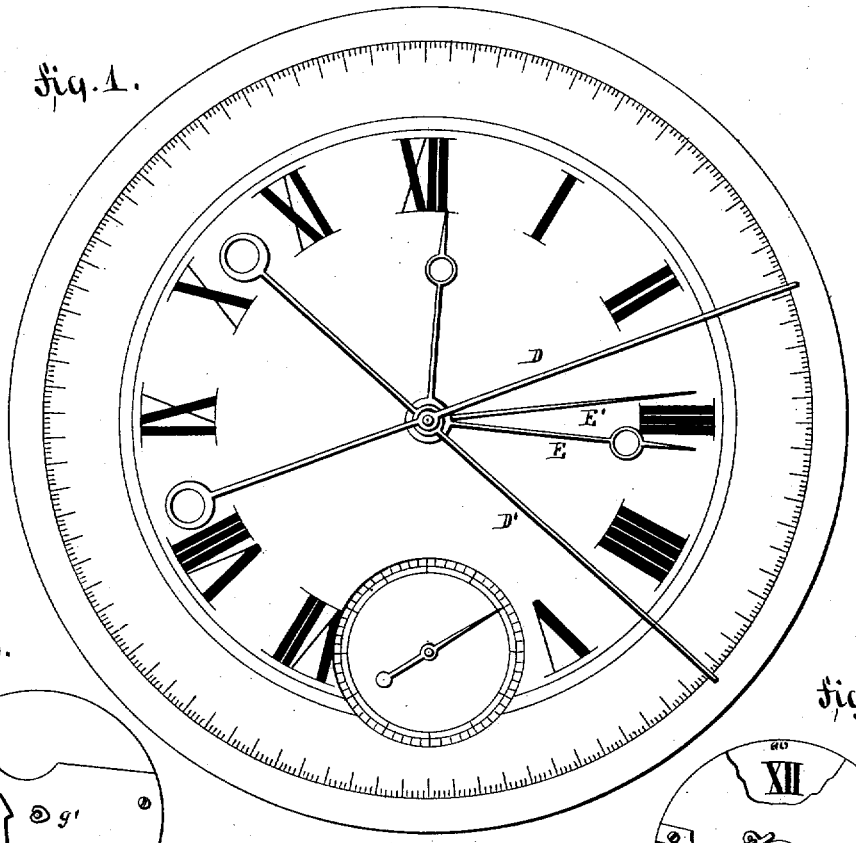
Figure 6:
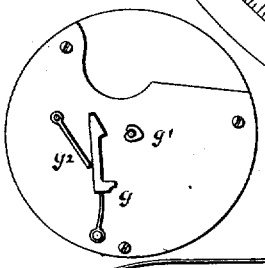
Figure 5:
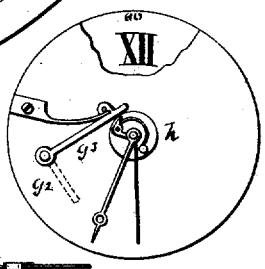
Figure 2:
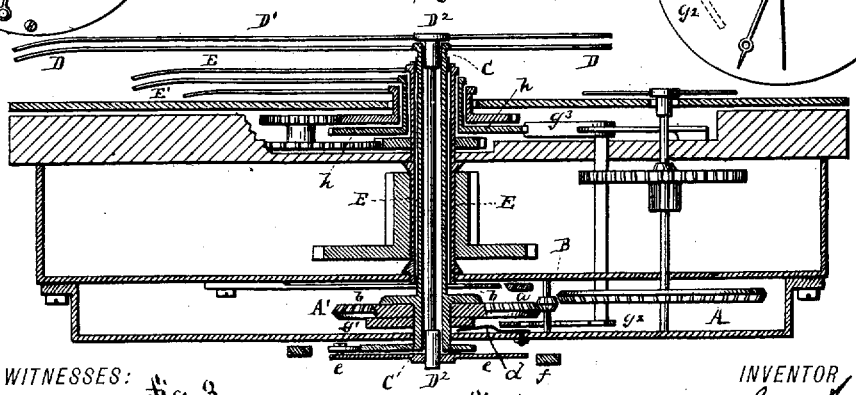
Figure 3:
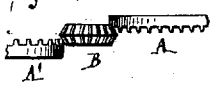
Figure 4:
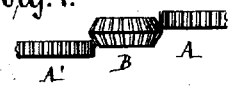

In the accompanying drawings, Figure 1 represents a face view of my improved stop-watch on an enlarged scale. Fig. 2 is a vertical central section of the same. Figs. 3 and 4 are detail side views of different forms of the motion-transmitting wheels and double-beveled pinion; and Figs. 5 and 6 are respectively a bottom and a top view of the movement, showing the mechanism for stopping the split minute-hand and shifting it to the minute-hand.

Similar letters of reference indicate corresponding parts.

Referring to the drawings, A represents a toothed wheel which is keyed to the arbor of the seconds-hand, and which is made either with straight or beveled teeth or in the nature of a crown-wheel, as shown, respectively, in Figs. 4, 2, and 3. The toothed wheel meshes, by a small intermediate double-beveled pinion, B, with a second gear-wheel, A′, which is keyed to a hollow arbor, C, that passes through the hollow arbor of the minute-hand and to the other side of the movement, and carries at its opposite end the quarter-second hand D, which moves along a suitably-graduated auxiliary dial that encircles the face-dial of the watch. The split quarter-second hand D′ is arranged on the same side of the movement, its arbor $D^2$ being passed through the hollow arbor of the quarter second hand.

The quarter-second hand D is set in motion by throwing the toothed wheel A′ into gear with the intermediate double-beveled pinion B, which is accomplished by the withdrawing of the beveled lever *a* from the lifting-spring *b*, and the action of a spring, *d*, interposed between the toothed wheel and frame of the movement.

By throwing the lever *a* under the spring *b* the spring *b* lifts the hollow arbor C and gear-wheel A′, so that the connection with the double-beveled pinion is interrupted, and the motion of the quarter-second hand stopped.

The split quarter-second hand is stopped in the customary manner in stop-watches by a friction-disk, *e*, and lever *f* at the top of the movement, and sent after the quarter-second hand by the usual spring and cam. Both hands D and D′ are then returned jointly to the starting-point by the usual return-lever, *g*, and heart-shaped cam *g′* on the arbor of the quarter-second hand employed in stop-watches.

The arbor of the minute-hand E carries a disk, *h*, to which the split minute-hand E′ is connected by a sleeve.

The split minute-hand works in connection with the quarter-second hand, as follows: When the quarter-second hand is set in motion, the return-lever $g$ is carried away from the heart-shaped cam, and, pushing against a lever-arm, $g^2$, throws a lever-arm, $g^3$, at the opposite end of its shaft against a disk, $h$, of the split minute-hand, so as to stop it. The minute-hand then goes on, while the split minute-hand is stopped. When the return-lever $g$ at the end of the observation falls back to its first position on its cam, the lever-arm $g^3$ releases the disk $h$, which, by means of its spring, sends the split minute-hand into line with the minute-hand, and returns simultaneously therewith the quarter-second and split quarter-second hands to the starting-point.

Having thus described my invention, I claim as new, and desire to secure by Letters Patent—

1. In a stop-watch, the combination of a toothed wheel on the arbor of the seconds-hand, and of an intermediate double-beveled transmitting-pinion, with a toothed wheel on the arbor of the quarter-second hand, and with a lever and spring devices for throwing the toothed wheel of the quarter second hand in or out of gear with the transmitting-pinion, as set forth.

2. In a stop-watch, the combination of the hollow arbor of the minute-hand, the hollow arbor of the quarter-second hand passing through the hollow arbor of the minute-hand, transmitting-gearing located at the top of the movement, mechanism for throwing the arbor of the quarter-second hand in or out of mesh with said gearing, the arbor of the split quarter-second hand passing through the hollow arbor of the quarter-second hand, and mechanism located at the top of the movement for actuating said split quarter-second hand, substantially as set forth.

3. In a stop-watch, the combination of the hollow arbor of the minute-hand, carrying a disk and split minute-hand, with a stop-lever and shifting mechanism working jointly with the shifting mechanism of the quarter-second hand, substantially as set forth.

In testimony that I claim the foregoing as my invention I have signed my name in presence of two witnesses.

HENRY A. LUGRIN.

Witnesses:
CARL KARP,
SIDNEY MANN.